Patented Aug. 6, 1929.

1,723,183

UNITED STATES PATENT OFFICE.

RUDOLF KONRAD, OF BERLIN-STEGLITZ, GERMANY, ASSIGNOR TO GENERAL ANILINE WORKS, INC., OF NEW YORK, N. Y., A CORPORATION OF DELAWARE.

PRODUCTION OF AZO DYESTUFFS ON WEIGHTED SILK AND RESULTING PRODUCT.

No Drawing. Application filed April 30, 1927, Serial No. 188,054, and in Germany May 11, 1926.

In application Serial Number 679191/2 of 9th of November 1925 of Kurt Woetzel and Heinrich Lint the production of azodyestuffs on real silk is described consisting in impregnating the silk fiber with a solution of an azocomponent having a substantive character, i. e., possessing an affinity to the vegetable fiber and developing with a diazosolution. But this process is not applicable for dyeing weighted silk, as by treating weighted silk in an impregnating bath containing caustic alkali the agents for weight giving, consisting of stannous compounds, are partly separated from the fiber and yield precipitates by reacting with the dyestuff component dissolved in the impregnating bath.

According to my invention the production of azodyestuffs on weighted silk is carried out by impregnating it with a caustic alkaline solution of an azocomponent having a substantive character, to which solution a soluble silicate and in a given case also a soluble phosphate is added, and developing with a diazosolution. In consequence of these additions the impregnating bath remains entirely clear, the azocomponent goes uniformly on the fiber and the dyed silk has no loss as to lustre and touch.

The following example will further illustrate my invention, but it is understood, that my invention is not limited to the particular proportions, reacting conditions or materials listed therein.

*Example.*

Weighted silk is impregnated for about 20–25 minutes at 20–30° C. with a solution, containing in the litre 2.5 grs. of the anilide of 2.3-hydroxynaphthoic acid and 15 c. c. of a solution of silicate of soda of 25° Bé. Then 10 grs. of common salt, dissolved in about 40 c. c. of water, pro litre are added, the material is handled for further 20 minutes and is developed after well centrifugating with an acetic acid solution, containing 3 grs. of diazotized meta-nitro-ortho-anisidin-hydrochloride in the litre; then the material is feebly acidified with hydrochloric acid, well rinsed and twice soaked for about 15 minutes with an almost boiling solution, containing 4–5 grs. of soap of Marseille in the litre, rinsed while warm and cold, scrooped by treatment with formic, sulfuric or tartaric acid and dried.

The anilide of 2.3-hydroxynapthoic acid is dissolved in an one-and-a-half times quantity of caustic soda solution of 34° Bé. after addition of the same quantity of Turkey red oil and the half quantity of glue. As a protective colloid the half quantity of "protectol I double powder" (compare color index 1924, page 363, and Fierz-David Technologie der Textil-Faser 1926, volume 3, page 389, according to which "protectol" is obtainable by evaporating sulfite waste liquor) is added to the impregnating bath.

The scarlet red dyeing, thus obtained, is distinguished by an excellent fullness, lustre and touch.

The same effect is obtained by using instead of a silicate a soluble phosphate or a mixture of both.

In the described manner also other azocomponents having a substantive character such as other arylides of 2.3-hydroxynaphthoic acid and bodies, containing a methylenic group capable of combining may be used for the impregnation after addition of a soluble silicate or phosphate or of a mixture of both and also other diazocompounds for the development.

I claim:

1. The production of azodyestuffs on weighted silk comprising impregnating the weighted silk fiber with the alkaline solution of an azocomponent having a substantive character, to which solution a soluble silicate is added, and developing with a diazosolution.

2. The production of azodyestuffs on weighted silk comprising impregnating the weighted silk fiber with the alkaline solution of an azocomponent having a substantive character, to which solution a soluble silicate and a soluble phosphate are added, and developing with a diazosolution.

3. The production of azodyestuffs on weighted silk comprising impregnating the weighted silk fiber with the alkaline solution of an arylide of 2.3-hydroxynaphthoic acid, to which solution a soluble silicate is added, and developing with a diazosolution.

4. The production of azodyestuffs on weighted silk comprising impregnating the weighted silk fiber with the alkaline solution of an arylide of 2.3-hydroxynaphthoic acid, to which solution a soluble silicate and a soluble phosphate are added, and developing with a diazosolution.

5. Silk materials dyed according to the process of claim 1.

6. Silk materials dyed according to the process of claim 2.

7. Silk materials dyed according to the process of claim 3.

8. Silk materials dyed according to the process of claim 4.

In testimony whereof, I affix my signature.

RUDOLF KONRAD.